United States Patent
Wilson, Jr. et al.

(10) Patent No.: US 8,502,436 B2
(45) Date of Patent: Aug. 6, 2013

(54) ELECTRIC MOTOR HAVING AN END FRAME

(75) Inventors: Philip A. Wilson, Jr., Troy, OH (US); Edward Drye, Troy, OH (US)

(73) Assignee: Regal Beloit America, Inc., Beloit, WA (US)

( * ) Notice: Subject to any disclaimer, the term of this patent is extended or adjusted under 35 U.S.C. 154(b) by 206 days.

(21) Appl. No.: 13/026,424

(22) Filed: Feb. 14, 2011

(65) Prior Publication Data

US 2012/0206022 A1    Aug. 16, 2012

(51) Int. Cl.
 *H02K 5/15* (2006.01)
(52) U.S. Cl.
 USPC ................................ 310/401; 310/89; 310/90
(58) Field of Classification Search
 CPC ..... H02K 5/16; H02K 5/00–5/26; H02K 7/08
 USPC .............................. 310/89, 401–418, 400, 90
 See application file for complete search history.

(56) References Cited

U.S. PATENT DOCUMENTS

| | | | |
|---|---|---|---|
| 2,164,449 A | 7/1939 | Delaval-Crow | |
| 2,249,501 A | 7/1941 | Teker | |
| 2,337,403 A | 12/1943 | Myers et al. | |
| 2,548,644 A | 4/1951 | Wightman | |
| 2,959,457 A | 11/1960 | Szymalak | |
| 3,048,724 A | 8/1962 | Mueller | |
| 3,112,417 A | 11/1963 | Tamm | |
| 3,300,666 A | 1/1967 | Frazier et al. | |
| 3,463,949 A | 8/1969 | Stone | |
| 3,555,320 A | 1/1971 | Johnson | |
| 3,732,616 A | 5/1973 | Masrrodonato et al. | |
| 3,832,582 A | 8/1974 | McDonald et al. | |
| 3,833,276 A | 9/1974 | Baumann et al. | |
| 3,846,652 A | 11/1974 | Lykes | |
| 4,082,381 A | 4/1978 | Simmons et al. | |
| 4,186,319 A | 1/1980 | Dochterman | |
| 4,262,224 A | 4/1981 | Kofink et al. | |
| 4,603,865 A | 8/1986 | Bien | |
| 4,631,433 A | 12/1986 | Stokes | |
| 4,668,898 A | 5/1987 | Harms et al. | |
| 4,705,983 A | 11/1987 | Franz et al. | |

(Continued)

FOREIGN PATENT DOCUMENTS

| | | | |
|---|---|---|---|
| DE | 102009001948 A1 * | 9/2010 | |
| EP | 0412954 | 2/1991 | |

(Continued)

OTHER PUBLICATIONS

Machine Translation, EP 0412954 A1, Feb. 13, 1991.*

(Continued)

*Primary Examiner* — Tran Nguyen
*Assistant Examiner* — Thomas Truong
(74) *Attorney, Agent, or Firm* — Michael Best & Friedrich LLP (57) ABSTRACT

An electro-dynamic machine including a rotor shaft extending along an axis and a bearing rotatably supporting the rotor shaft for rotation about the axis. An inner housing has an outer surface and defines a bearing bore. The bearing bore receives and supports the bearing. An outer housing surrounds the inner housing. A plurality of non-radial ribs extends from the outer housing to the inner housing. The non-radial ribs are coupled to the inner housing substantially tangential to the outer surface.

13 Claims, 6 Drawing Sheets

U.S. PATENT DOCUMENTS

| | | | |
|---|---|---|---|
| 4,823,032 | A | 4/1989 | Ward et al. |
| 4,958,940 | A | 9/1990 | Morrill |
| 5,001,377 | A | 3/1991 | Parkinson |
| 5,127,148 | A | 7/1992 | Lykes et al. |
| 5,258,675 | A | 11/1993 | Nelessen |
| 5,322,373 | A | 6/1994 | Oakes et al. |
| 5,327,036 | A | 7/1994 | Carey |
| 5,430,931 | A | 7/1995 | Fisher et al. |
| 5,475,275 | A | 12/1995 | Dohogne et al. |
| 5,610,461 | A | 3/1997 | Dohogne et al. |
| 5,767,596 | A | 6/1998 | Stark et al. |
| 6,133,658 | A | 10/2000 | Fisher et al. |
| 6,177,744 | B1 | 1/2001 | Subler et al. |
| 6,179,470 | B1 | 1/2001 | Huddleston et al. |
| 6,225,720 | B1 | 5/2001 | Desta |
| 6,343,794 | B1 | 2/2002 | Brown |
| 6,559,566 | B2 | 5/2003 | Modi et al. |
| 6,675,936 | B2 | 1/2004 | Sevola |
| 6,750,578 | B2 | 6/2004 | Buening et al. |
| 6,774,514 | B2 | 8/2004 | Matsuoka et al. |
| 7,105,960 | B2 | 9/2006 | Ooiwa |
| 7,196,438 | B2 | 3/2007 | Williams et al. |
| 7,598,641 | B2 | 10/2009 | Baumgartner et al. |
| 8,278,793 | B2 * | 10/2012 | Newberg et al. ................ 310/91 |
| 2004/0253122 | A1 | 12/2004 | Grochowski |
| 2006/0204151 | A1 | 9/2006 | Wang et al. |
| 2007/0189892 | A1 | 8/2007 | Oguma |
| 2008/0179979 | A1 | 7/2008 | Nolley |
| 2009/0160276 | A1 | 6/2009 | Ley |
| 2009/0174269 | A1 | 7/2009 | Ibaraki |

FOREIGN PATENT DOCUMENTS

| | | |
|---|---|---|
| GB | 2337796 | 12/1999 |
| JP | 54061204 | 4/1979 |
| JP | 54107812 | 7/1979 |
| JP | 6221331 | 8/1994 |

OTHER PUBLICATIONS

International Search Report and Written Opinion for Application No. PCT/US2012/024963 dated Jun. 13, 2012 (11 pages).

International Search Report and Written Opinion for Application No. PCT/US2012/024959 dated Jun. 25, 2012 (12 pages).

* cited by examiner

ELECTRIC MOTOR HAVING AN END FRAME

BACKGROUND

The present invention relates to electric motors. More particularly, the invention relates to an electric motor that includes an end frame.

An end frame for an electric motor should generally be rigid in order to minimize vibration and other adverse effects. In some cases, it is desirable to provide a flow path through the end frame for air cooling of the motor components. Some electric motors may also require periodic maintenance at the end frame, including the addition of grease to one or more shaft bearings.

SUMMARY

In one embodiment, the invention provides an electrodynamic machine including a rotor shaft extending along an axis and a bearing rotatably supporting the rotor shaft for rotation about the axis. An inner housing has an outer surface and defines a bearing bore. The bearing bore receives and supports the bearing. An outer housing surrounds the inner housing. A plurality of non-radial ribs extends from the outer housing to the inner housing. The non-radial ribs are coupled to the inner housing substantially tangential to the outer surface.

In another embodiment the invention provides a motor including a rotor and a bearing. A cylindrical inner housing has an outer surface and an inner bore is disposed along an axis and sized to receive and support the bearing. An annular outer housing is disposed concentrically about the inner housing. A first non-radial rib extends from the outer housing to the inner housing. The first non-radial rib is arranged substantially tangentially to the outer surface. A second non-radial rib extends from the outer housing to the inner housing. The second non-radial rib is arranged substantially tangentially to the outer surface. The second non-radial rib cooperates with the first non-radial rib to define a V-shaped rib pair having a vertex adjacent the outer housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
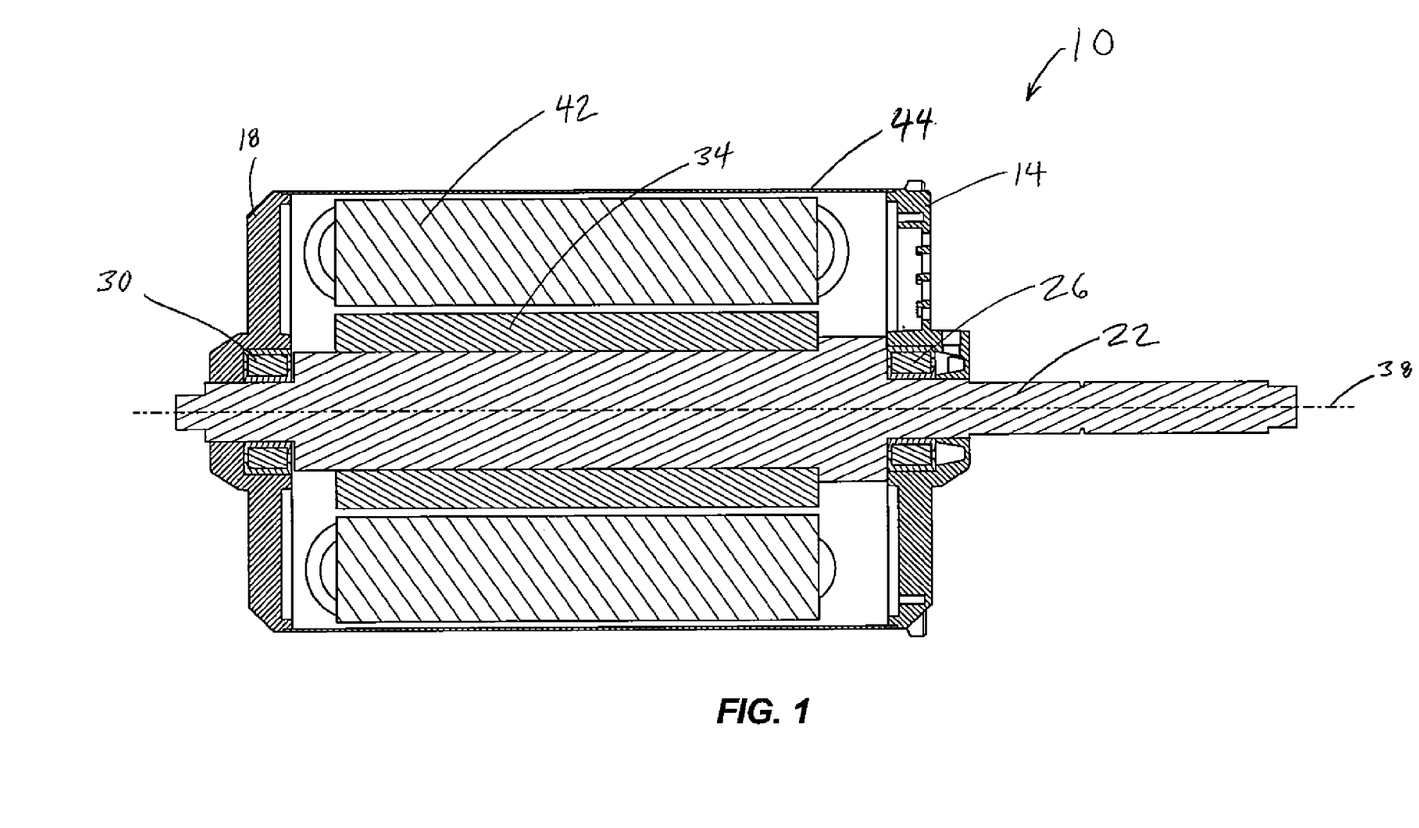
FIG. 1 is a cross-sectional view of an electric motor.

FIG. 1 is a schematic cross section of an electric motor 10. The electric motor 10 includes an end frame 14 and an opposite end frame 18. A rotor shaft 22 is rotatably supported by an end frame bearing 26 and an opposite end frame bearing 30. The rotor shaft 22 supports a rotor 34 for rotation about an axis 38. The rotor 34 rotates relative to a stator 42. The stator 42 is enclosed within a stator housing 44 and is disposed between the end frame 14 and the opposite end frame 18.

Figure 2:
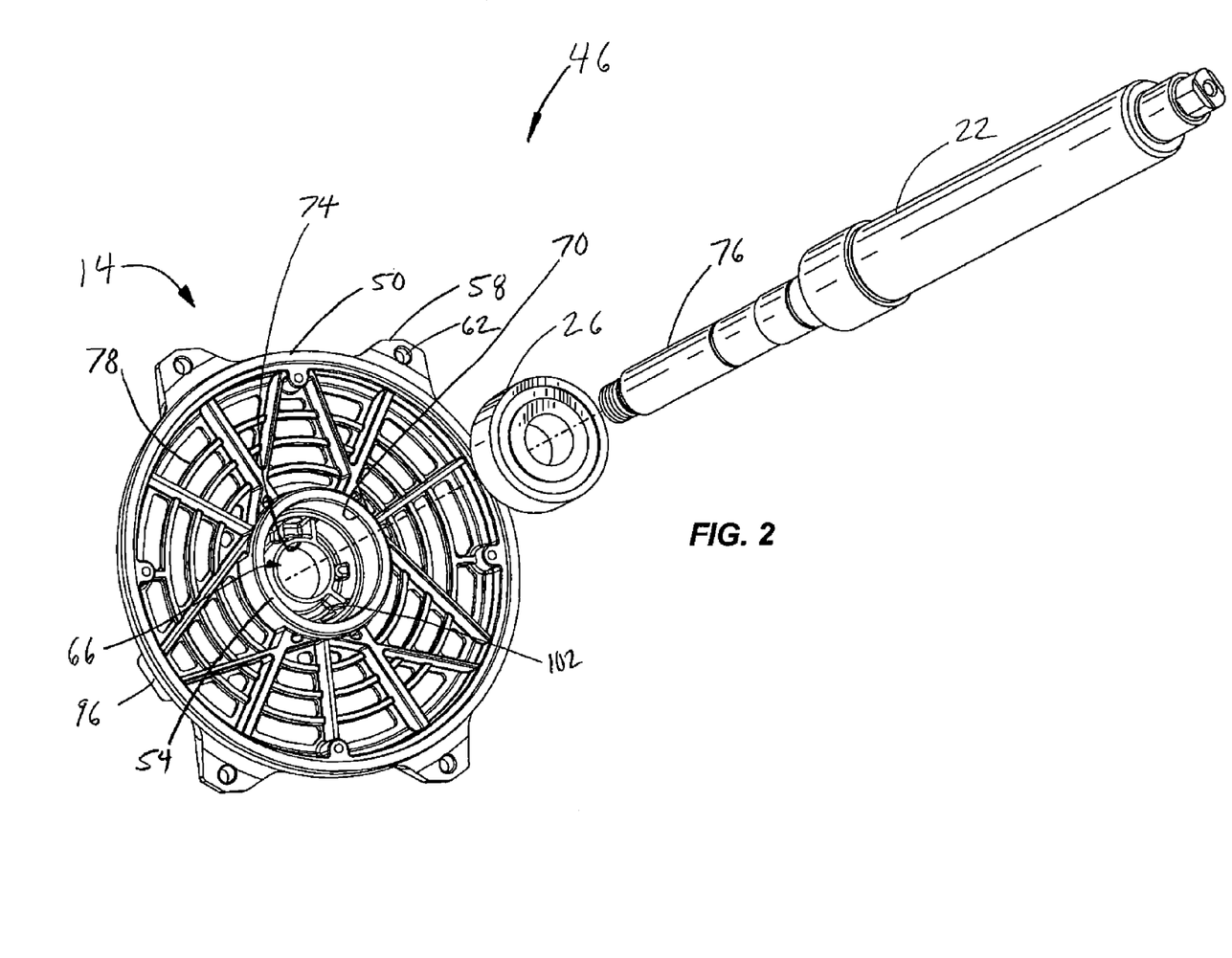
FIG. 2 is an exploded perspective view of a sub-assembly of the electric motor of FIG. 1.

FIG. 2 is an exploded perspective view of a sub-assembly 46 of the electric motor 10. More specifically, the sub-assembly 46 includes the rotor shaft 22, the end frame bearing 26, and the end frame 14. The end frame 14 includes an outer housing 50 and an inner housing 54. The outer housing 50 includes four mounting flanges 58. Each mounting flange 58 includes a through-hole 62. The through-holes 62 are provided, for example, to receive assembly bolts for coupling the end frame 14 to the opposite end frame 18. Fewer than four through-holes 62 or more than four may alternatively be provided, as required.

The inner housing 54 defines a bearing cavity 66. The bearing cavity 66 includes a precision bearing bore 70. The bearing bore 70 is configured to receive the end frame bearing 26. A shaft aperture 74 of the inner housing 54 allows an extension 76 of the shaft 22 to pass through the end frame 14 and couple to the load.

Figure 3:
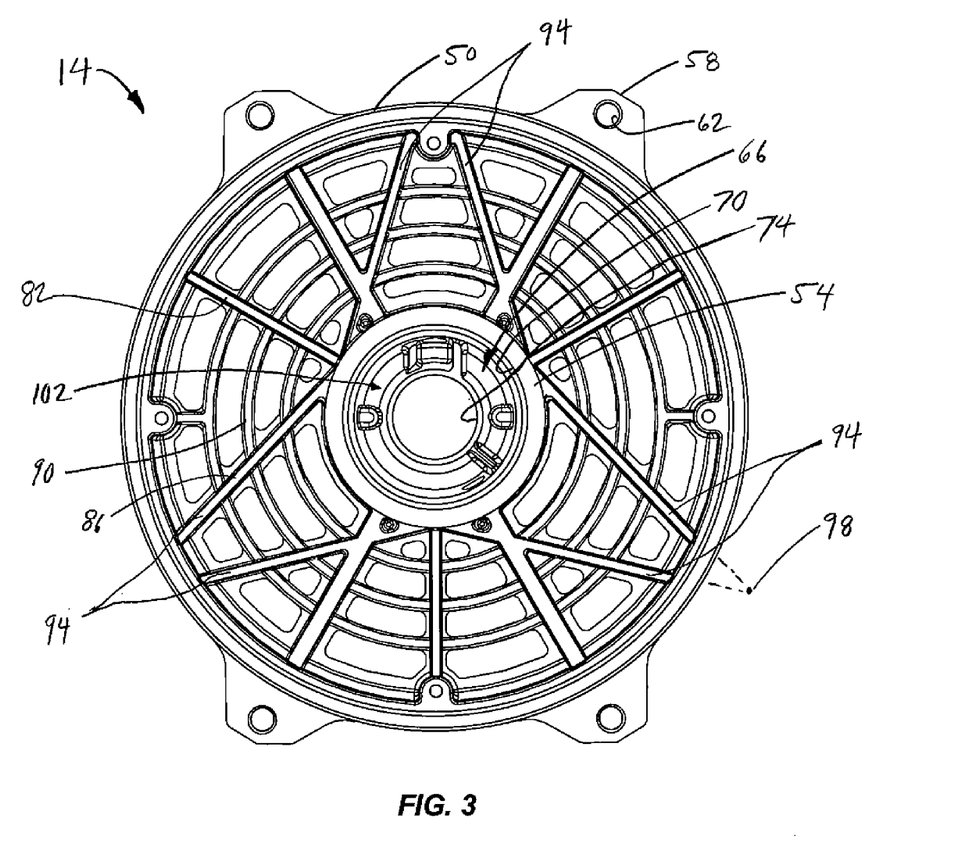
FIG. 3 is a top view of an end frame of the sub-assembly of FIG. 2.

A ventilated lattice 78 connects the outer housing 50 and inner housing 54. The lattice 78 facilitates the flow of air (or other fluids) through the motor to cool the rotor, stator, and bearings during motor operation. With reference to FIG. 3, the lattice 78 is formed by a combination of radial ribs 82, non-radial ribs 86, and annular ribs 90. As used herein, "non-radial" ribs do not include annular ribs. The lattice 78 is sufficiently rigid to substantially minimize oscillation of the end frame 14, while at the same time allowing for adequate cooling flow through the motor, thereby improving the life of the end frame bearing 26. While the radial ribs 82, non-radial ribs 86, and annular ribs 90 are described herein as discrete elements, in the illustrated embodiment, the entire end frame 14 is formed as a single component. The inner housing 54, outer housing 50, and lattice 78 may be formed by casting, forging, machining, injection molding, or other known manufacturing methods.

During assembly of the electric motor 10, the end frame 14 should slide freely over the end frame bearing 26. If the bearing bore 70 is out of round, a number of assembly problems may result. For example, if the end frame 14 is forced over the bearing 26 with a mallet, the resulting impact forces may dent the balls and/or raceways of the bearing assembly, which may result in premature bearing wear. The non-radial ribs 86 are configured to reduce deformation of the bearing bore 50 during machining of the end frame 22.

As best illustrated in FIG. 3, the non-radial ribs 86 are arranged in three pairs 94. The three pairs 94 of non-radial ribs 86 are arranged symmetrically (i.e., each pair 94 is approximately 120 degrees apart from the next pair). This symmetrical arrangement of the three pairs 94 corresponds generally to contact points 96 (FIGS. 2 and 5) for a three jawed chuck, such as is used to hold the end frame 14 when machining the bearing bore 70 and other surfaces of the end frame 14. Referring back to FIG. 3, the non-radial ribs 86 of each pair 94 form a "V" shape, with a vertex 98 adjacent the outer housing 50. In the illustrated embodiment, the vertex 98 is illustrated radially outward of the outer housing 50. In other embodiments, the vertex may lie on or in the housing 50. Each of the non-radial ribs 86 contacts the inner housing 54 substantially tangentially, as opposed to radially. With this arrangement, the non-radial ribs 86 transmit clamping forces to the inner housing and apply them in a direction that is tangent to the bore, thereby reducing deformation of the inner housing 54 when chucked. The resulting bearing bore 70 can be machined with a roundness having a tighter tolerance than would otherwise be possible with radial ribs that transmit the chuck clamping forces to radially to the bore.

In addition to the non-radial ribs 86, three of the radial ribs 82 are arranged symmetrically between non-radial ribs 86. Additional radial ribs 82 cross, or intersect, several of the non-radial ribs 86.

Figure 4:
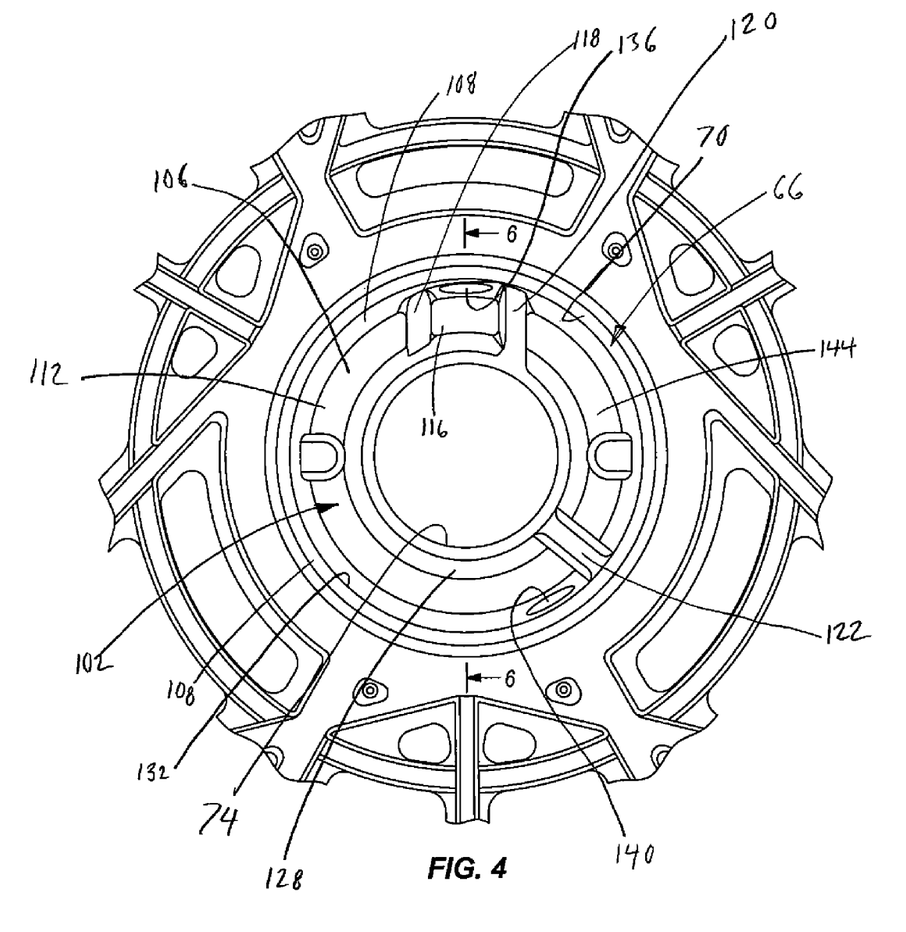
FIG. 4 is a top view of a bearing lubrication system of the end frame of FIG. 3.
Figure 6:
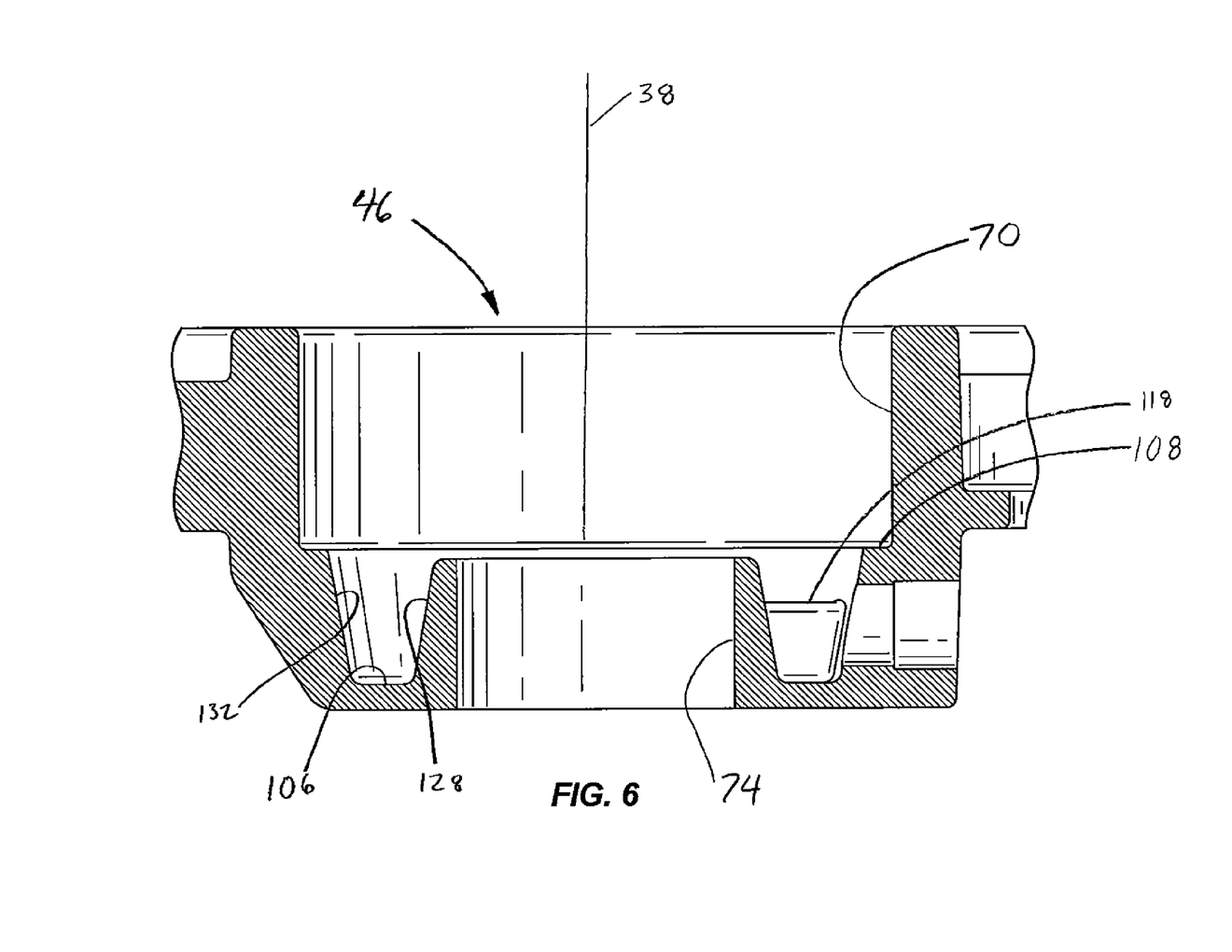
FIG. 6 is a cross sectional view of the bearing lubrication system of FIG. 4 taken along section line 6-6.

The bearing cavity 66 includes a bearing lubrication system 102. With reference to FIGS. 4 and 6, the bearing lubrication system 102 extends from a base wall 106 of the bearing cavity 66 toward an axial seating surface 108 of the bearing bore 70. The base wall 106 surrounds the shaft aperture 74. When the end frame bearing 26 is installed in the bearing bore 70, the bearing 26 encloses the bearing lubrication system 102. The bearing lubrication system 102 includes a grease storage chamber 112, a charging chamber 116, and a metering wall 118. The charging chamber 116 extends circumferentially about the shaft aperture 74 from a first boundary wall 120 to the metering wall 118. The grease storage chamber 112 extends circumferentially about the shaft aperture 74 from the metering wall 118 to a second boundary wall 122. The first boundary wall 120 and second boundary wall 122 extend axially to the same level as the axial seating surface 108, and therefore define a portion of the seating surface 108 and make contact with the end frame bearing 26 when installed. As shown in FIG. 6, the metering wall 118 does not extend all the way to the axial seating surface 108 of the bearing bore 70.

The charging chamber 116 and storage chamber 112 are both bounded by an inner annular wall 128 and an outer annular wall 132. In the illustrated embodiment, the inner annular wall 128 of the charging chamber 116 and storage chamber 112 is not parallel to the axis 38 (i.e., frusto-conical). When the motor assembly 10 is mounted with the axis 38 horizontal, the shape of the inner annular wall 128 assists grease in from the charging chamber and a portion of the storage chamber migrating toward the bearing 26 during motor operation.

Figure 5:
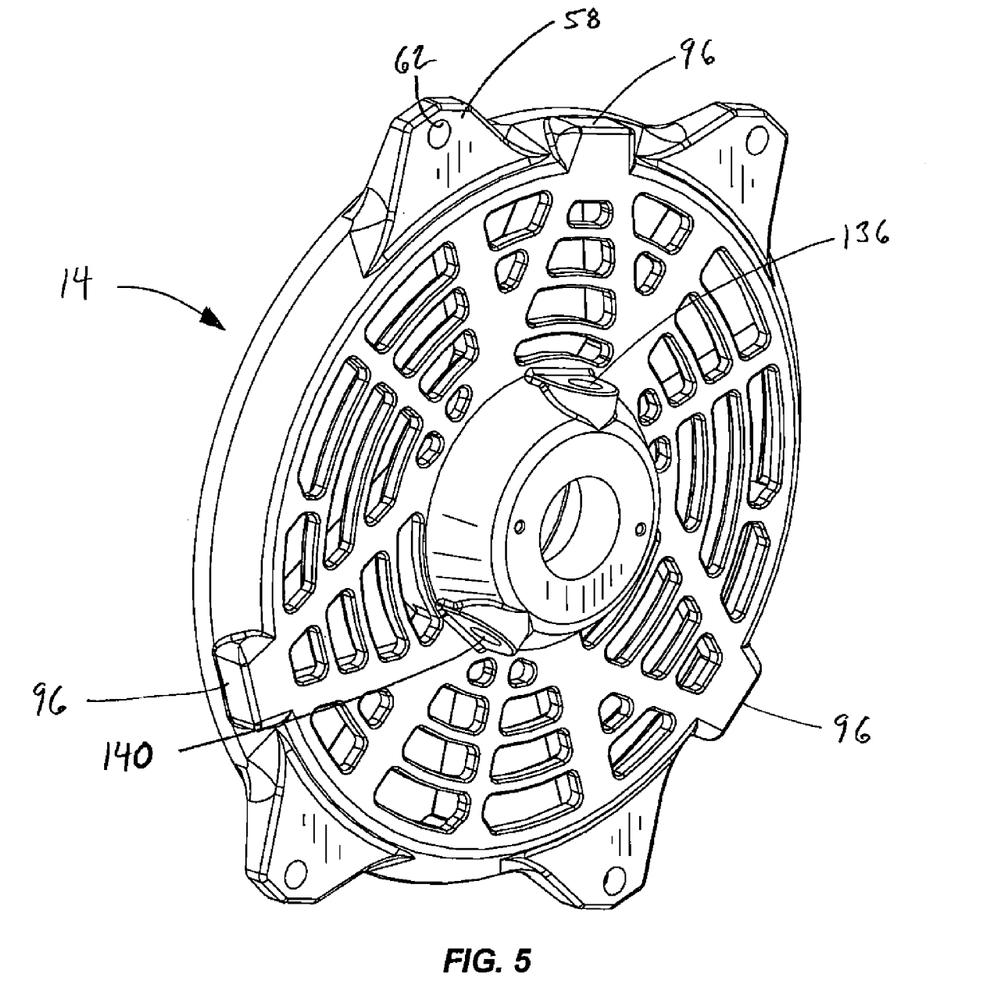
FIG. 5 is a bottom perspective view of the end frame of FIG. 3.

As shown in FIGS. 4 and 5, the charging chamber 116 receives grease from a grease inlet port 136. The grease inlet port 136 may be threaded for a screw-in grease fitting (such as a "Zerk" fitting), or it may be otherwise coupled to a grease conduit or other source of grease. The metering wall 118 acts as a flow restrictor between the charging chamber 116 and the storage chamber 112. Fresh grease entering the charging chamber 116 from the inlet port 136 will have a tendency to enter the bearing 26. As voids between ball bearings within the bearing 26 fill with grease, excess grease from the charging chamber 116 will migrate over the metering wall 118 and into the storage chamber 112. New grease entering the storage chamber 112 from the charging chamber 90 will force old grease out. Grease exits the storage chamber 112 through an exit port 140.

As best illustrated in FIG. 4, the charging chamber 116 and storage chamber 112 together do not provide a full 360 degrees of grease to the bearing bore 70. Rather, a bounded area 144 between the first boundary wall 120 and the second boundary wall 122, in the clockwise direction from the perspective of FIG. 2, is intended to remain free of grease. The storage chamber 112 plus the charging chamber 116 provides an optimal amount of grease to the bearing 18. Because the first boundary wall and second boundary extend to the same level as the axial bearing seating surface, they substantially inhibit grease from entering the bounded area 144. By maintaining the bounded area 144 of the bearing lubrication system 102 grease-free, heat transfer from the bearing 26 to the end-frame 14 is improved, thereby improving bearing life.

Thus, the invention provides, among other things, an end-frame 14 for an electric motor assembly 10. Various features and advantages of the invention are set forth in the following claims.

What is claimed is:

1. An electro-dynamic machine comprising:
   a rotor shaft extending along an axis;
   a bearing rotatably supporting the rotor shaft for rotation about the axis;
   an inner housing having an outer surface and defining a bearing bore, the bearing bore receiving and supporting the bearing;
   an outer housing surrounding the inner housing;
   a plurality of non-radial ribs extending from the outer housing to the inner housing, the non-radial ribs coupled to the inner housing substantially tangential to the outer surface; and
   a plurality of radial ribs, wherein a none zero first portion of the radial ribs intersect one of the non-radial ribs, and wherein a none zero second portion of the radial ribs do not intersect any of the non-radial ribs.

2. The electro-dynamic machine of claim 1, further comprising at least one annular rib disposed between the outer housing and the inner housing.

3. The electro-dynamic machine of claim 1, wherein at least a portion of the non-radial ribs are arranged in v-shaped pairs, with a vertex of each v-shaped pair adjacent the outer housing.

4. The electro-dynamic machine of claim 3, wherein the pairs are symmetrically disposed about the axis.

5. The electro-dynamic machine of claim 1, wherein the non-radial ribs are arranged in three symmetrically disposed, v-shaped pairs, with a vertex of each v-shaped pair adjacent the outer housing.

6. The electro-dynamic machine of claim 1, wherein the inner housing, the outer housing, and the plurality of non-radial ribs are formed as one-piece.

7. The electro-dynamic machine of claim 1, further comprising a plurality of annular ribs, wherein the radial ribs, non-radial ribs, and annular ribs form a lattice coupling the outer housing to the inner housing.

8. A motor comprising:
   a rotor;
   a bearing;
   a cylindrical inner housing having an outer surface and an inner bore disposed along an axis and sized to receive and support the bearing;
   an annular outer housing disposed concentrically about the inner housing;
   a first non-radial rib extending from the outer housing to the inner housing, the first non-radial rib arranged substantially tangentially to the outer surface;

a second non-radial rib extending from the outer housing to the inner housing, the second non-radial rib arranged substantially tangentially to the outer surface, the second non-radial rib cooperating with the first non-radial rib to define a V-shaped rib pair having a vertex adjacent the outer housing;

a first radial rib extending from the outer housing to the inner housing and spaced apart from each of the first non-radial rib and the second non-radial rib; and a second radial rib extending from the outer housing to the inner housing and intersecting the first non-radial rib in the space between the outer housing and the inner housing.

9. The motor of claim 8, wherein the V-shaped rib pair is a first V-shaped rib pair, and further comprising a third non-radial rib extending from the outer housing to the inner housing, the third non-radial rib arranged substantially tangentially to the outer surface;

a fourth non-radial rib extending from the outer housing to the inner housing, the fourth non-radial rib arranged substantially tangentially to the outer surface, the fourth non-radial rib arranged substantially tangentially to the outer surface, the fourth non-radial rib cooperating with the third non-radial rib to define a second V-shaped rib pair having a vertex adjacent the outer housing.

10. The motor of claim 9, further comprising a fifth non-radial rib extending from the outer housing to the inner housing, the fifth non-radial rib arranged substantially tangentially to the outer surface;

a sixth non-radial rib extending from the outer housing to the inner housing, the sixth non-radial rib arranged substantially tangentially to the outer surface, the fifth rib cooperating with the sixth non-radial rib to define a third V-shaped rib pair having a vertex adjacent the outer housing.

11. The motor of claim 10, wherein the three V-shaped rib pairs are radially symmetrically disposed about the axis.

12. The motor of claim 9, wherein the first radial rib is disposed between the first V-shaped rib pair and the second V-shaped rib pair.

13. The motor of claim 8, further comprising at least one annular rib disposed concentrically between the inner housing and the outer housing.

* * * * *